July 8, 1947.　　　　D. BIERMANN　　　　2,423,752
AIRSCREW
Filed Oct. 2, 1942　　　　4 Sheets-Sheet 1
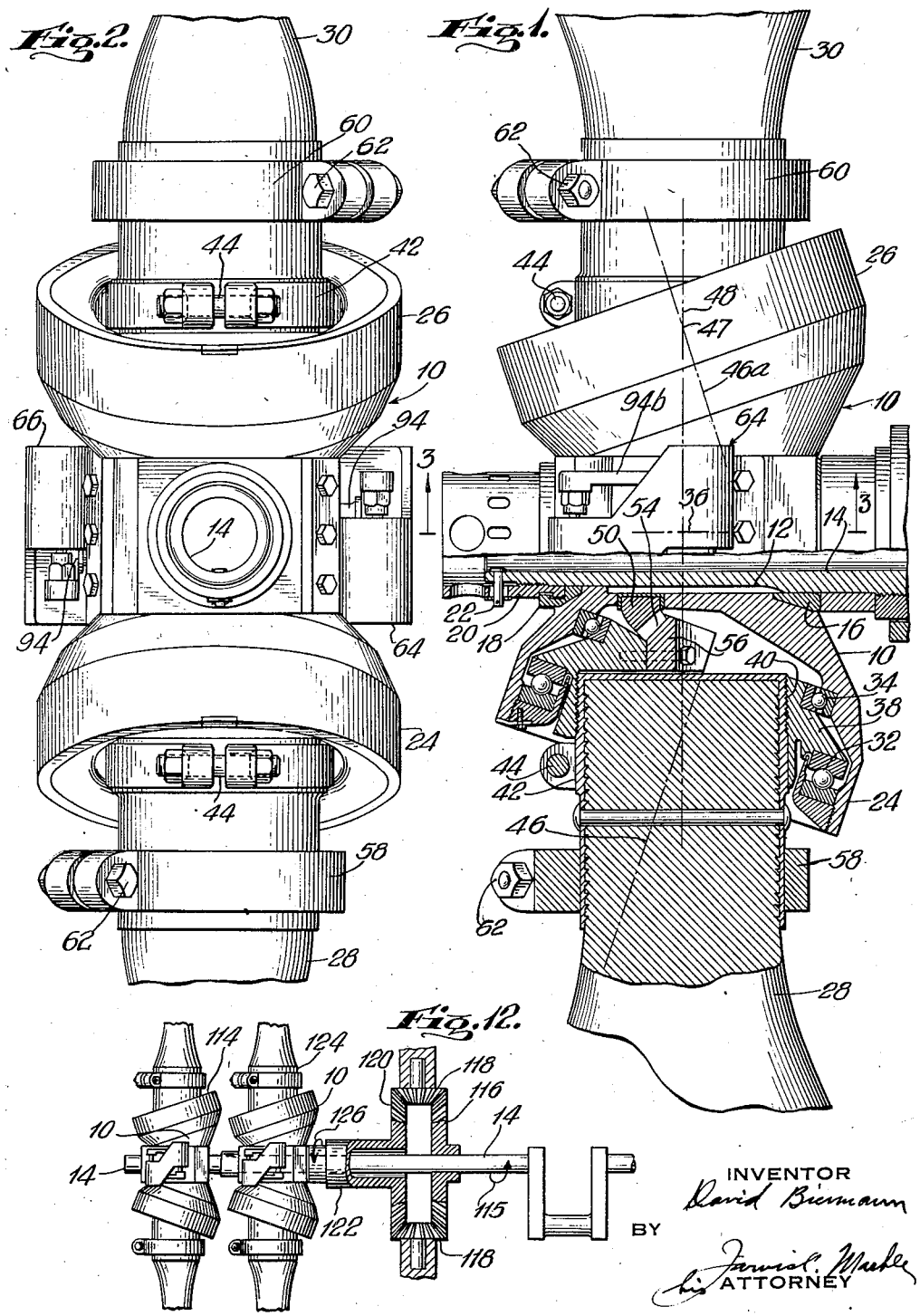

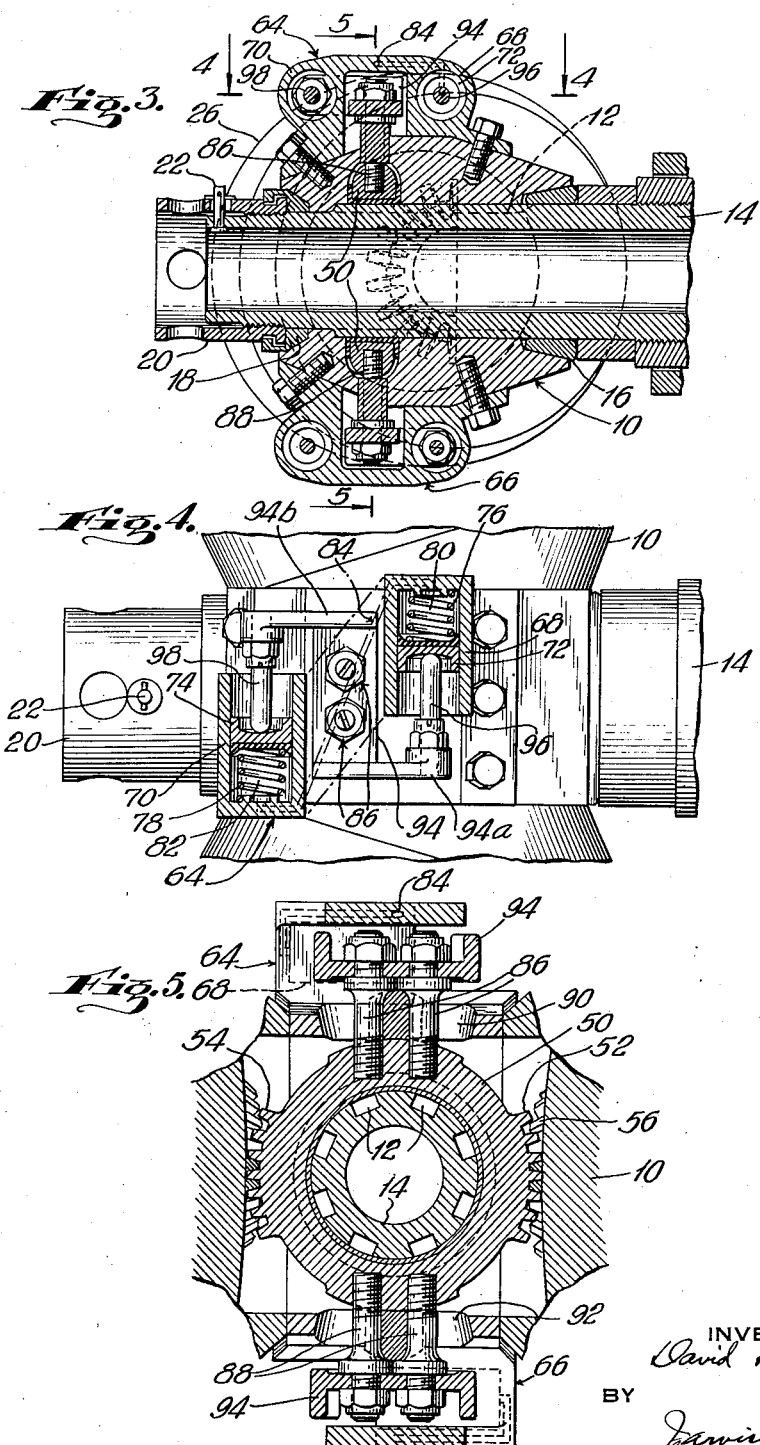

July 8, 1947.  D. BIERMANN  2,423,752
AIRSCREW
Filed Oct. 2, 1942  4 Sheets-Sheet 3
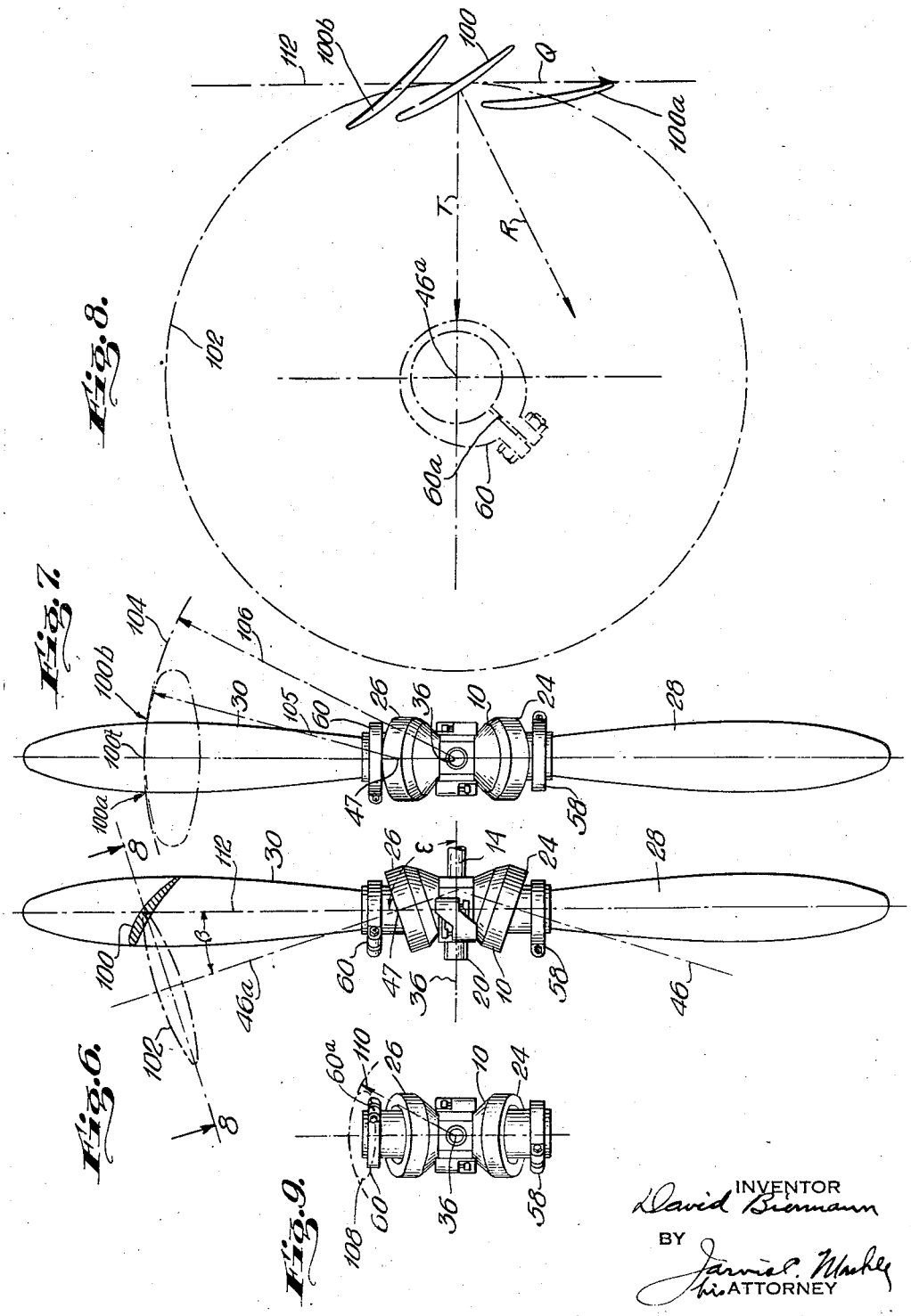
INVENTOR
David Biermann
BY
ATTORNEY July 8, 1947.  D. BIERMANN  2,423,752
AIRSCREW
Filed Oct. 2, 1942  4 Sheets-Sheet 4
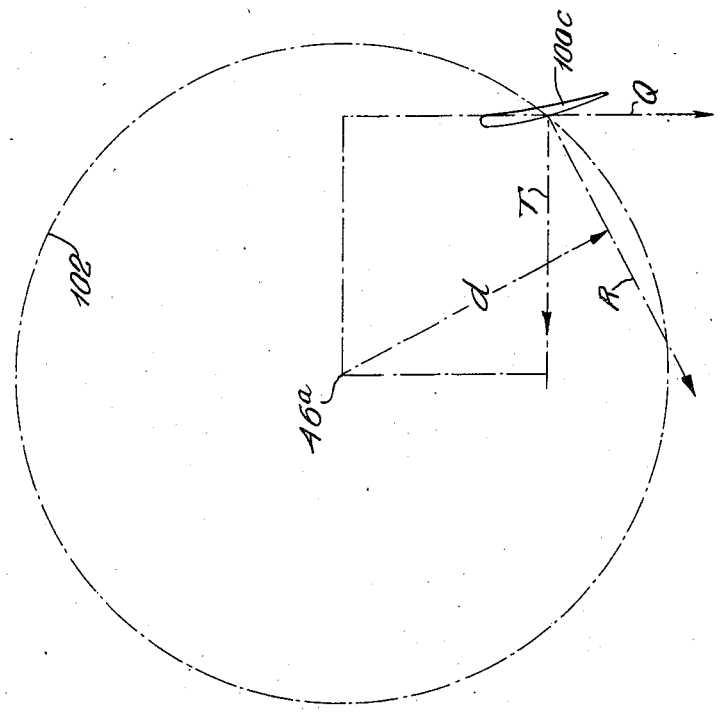
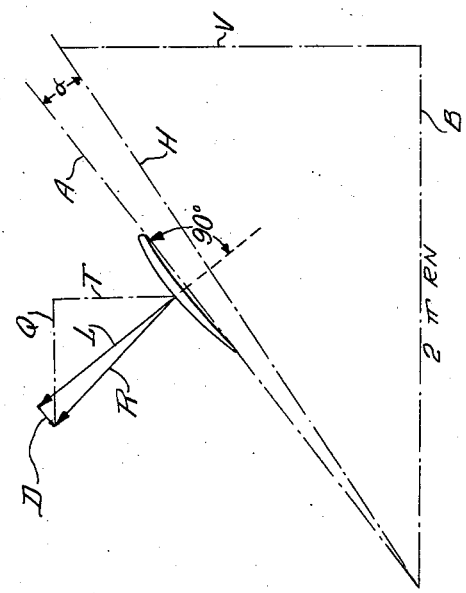
INVENTOR
David Biermann
BY
ATTORNEY Patented July 8, 1947

2,423,752

UNITED STATES PATENT OFFICE 2,423,752

AIRSCREW

David Biermann, Hampton, Va.

Application October 2, 1942, Serial No. 460,509

6 Claims. (Cl. 170—135.6)

The present invention relates to airscrews and has particular reference to airscrews used for the propulsion of aircraft. While the invention is not limited in its application to propellers, being equally applicable to fans or other types of airscrew devices, it is particularly applicable to aircraft propellers and by way of example but without limitation will be described and illustrated in its application to that use.

It is well known that in order to obtain maximum efficiency of propeller operation it is necessary to provide means for varying the pitch of the airscrew or propeller of an aircraft in order to compensate for variations in air speed and altitude. Also it is generally desirable to control the pitch of the propeller blades in such fashion that the rotational speed of the propeller (and of the engine driving it) is maintained constant for a predetermined engine power, regardless of changes in air speed or altitude.

In order to obtain the desired control of blade pitch, which will result in the maintenance of constant propeller speed for a given engine power being delivered, a large number of different expedients have been proposed for providing propellers in which the blade pitch is automatically varied to compensate for changes in the magnitudes of forces or combinations of forces acting on the propeller. Among these expedients are a number which have proposed that the control of the blade pitch be effected by suitably opposing torque moments produced by the engine power delivered to the propeller against moments developed by centrifugal forces resulting from rotation of the propeller.

In devices of this kind as heretofore proposed, the engine torque has been applied to propeller blades pivoted in the hub of the propeller, either by gearing transmitting the power from the engine drive shaft directly to the blades or by gearing, linkages or other mechanisms through which engine torque is applied to the pivoted blades through the medium of the propeller hub.

In all of these constructions the amount of torque transmitted to the blades is of very substantial value and in order to transmit the required forces relatively large and heavy gears or equivalent power transmitting mechanisms must be employed. This is an obvious disadvantage since it is highly desirable in all cases to have the construction of an aircraft propeller as simple in construction, compact and light as possible.

It is accordingly one of the general objects of the present invention to provide a novel and improved form of propeller construction in which moments derived from torque and centrifugal forces, respectively, are opposed to automatically control the pitch of the blades so that the rotational speed will be constant for any given engine power, and in which the engine torque is applied directly to the hub of the propeller, without the necessity for transmitting engine torque, as such, to the pivoted blades through any mechanical or other force transmitting connection other than the propeller hub.

Another of the general objects of the invention is the provision of novel and improved propeller construction for a dual or oppositely rotating propeller unit which is simple in construction and in which, because of the characteristic of the propellers constituting the dual unit, enable a construction to be employed in which, when both propellers are rotated at the same speed, but in opposite directions, the power absorbed by one will automatically be the same as that absorbed by the other without the necessity for torque or other force balancing mechanism for equalizing the amount of power transmitted from a common power shaft to each of the two different propellers.

Other and more detailed objects of the invention and the advantages to be derived from its use will appear more fully from the ensuing portion of this description taken in conjunction with the accompanying drawings in which there is described and illustrated by way of example but without limitation, suitable propeller apparatus for carrying the invention into effect.

In the drawings:

Fig. 1 is a side elevation partly in section, of propeller structure embodying the present invention;

Fig. 2 is a front view of the structure shown in Fig. 1;

Fig. 3 is a section taken on line 3—3 of Fig. 1;

Fig. 4 is a section taken on line 4—4 of Fig. 3;

Fig. 5 is a section taken on line 5—5 of Fig. 3;

Fig. 6 is a diagrammatic side view of the propeller embodying the invention illustrative of certain basic characteristics thereof;

Fig. 7 is a diagrammatic view looking from the rear of the propeller shown in Fig. 6;

Fig. 8 is a diagram taken on the plane 8—8 of Fig. 6;

Fig. 9 is a diagrammatic view looking from the front of the propeller shown in Fig. 6 and illustrating another characteristic feature of the propeller;

Fig. 10 is a diagram of forces acting on the propeller blade.

Fig. 11 is a view similar to Fig. 8 showing certain characteristics obtained with a propeller blade in a different position than that shown in Fig. 8; and Fig. 12 is a more or less diagrammatic elevation, partly in section, showing a dual propeller unit embodying the invention.

Referring now more particularly to Figs. 1 to 5, inclusive, the propeller comprises a hub member 10 which advantageously is in the form of an integral forging and which, in the example illustrated, is for a two-bladed propeller although it will be understood that the number of blades carried by a hub may be varied within the scope of the invention.

Hub 10 is secured by means of splines 12 on the driving or power shaft 14 and is held against axial displacement between tapered clamping rings 16 and 18, the latter being held in axially adjusted position by the locking sleeve 20 screwed on the end of shaft 14 and held in adjusted position by the pin 22.

Hub 10 carries two blade arms 24 and 26, in which are pivotally mounted the propeller blades 28 and 30, respectively. Since the mounting construction for each of the blades is the same, it will be sufficient to describe but one. Referring to the arm 24 shown in section in Fig. 1, this is hollowed out to generally cup-like form and carries spaced ball bearings 32 and 34 which, it will be noted, lie in planes oblique with respect to the axis of rotation 36 of the shaft and hub. The importance of this feature will be described later.

The inner races of bearings 32 and 34 are secured to a mounting member 38 of irregular configuration having a threaded bore 40 into which is screwed the ferrule 42 forming part of the shank structure or root portion of the blade. The ferrule is held in adjusted position in the mounting member 38 by means of a clamping bolt 44 passing through suitable apertures in a split portion of the member 38.

From Fig. 1 it will be observed that the oblique placement of the bearings results in the pivoting of the mounting member 38 and the blade structure carried by it, around an oblique axis 46 which is forwardly tilted with respect to the plane of rotation 48 of the propeller as a whole, which plane is normal to the axis of rotation 36. It will further be observed that the axis of the bore or socket in which the blade ferrule is received is not coincident with the inclined or tilted axis 46 but diverges therefrom in the construction illustrated. The blade extends radially outwardly from the ferrule and the relation of the angles is such that the axis of the blade is coincident with plane 48. This specific relationship, however, may be varied within the scope of the invention, as will be later explained.

An annular segmental gear member 50 is carried within the hub 10 around shaft 14, with respect to which and the hub, it is mounted for relative rotational movement in a suitable bearing. Member 50 carries segmental sets of bevel gear teeth 52 and 54. Each of the blade mounting members carries a segmental bevel gear, that carried by the member 38 being indicated at 56 in Fig. 1 and being shown in Fig. 5 as meshing with the set of teeth 52.

Auxiliary weights or masses, the purposes of which will later be explained, are preferably carried by the blades and these weights or masses may advantageously be in the form of eccentric clamping rings 58 and 60 encircling the shank portions of the respective blades and capable of being clamped in peripherally adjusted position by means of suitable clamping bolts 62.

For reasons which also hereinafter more fully appear, it is desirable in some instances to provide damping means for damping oscillating movement of the blades about their pivot axes and the propeller shown in Fig. 5 is equipped with one suitable form of means for effecting this purpose.

Referring now more particularly to Figs. 2 to 5, inclusive, the hub 10 is shown as having bolted thereto, on opposite sides, the cylinder members 64 and 66. These members are of like construction so it will be sufficient to describe one. As shown in Fig. 3 the cylinder member 64 is provided with two oppositely directed cylinders 68 and 70 in which are located respectively, the pistons 72 and 74 loaded by the springs 76 and 78 respectively. The piston and cylinder assemblies provide two chambers 80 and 82 respectively, which are placed in restricted communication by means of a connection 84 of relatively small diameter formed in the cylinder member 64.

The segmental gear member 50 carries two sets of substantially radially and oppositely projecting studs 86 and 88 respectively, which project through transverse slots 90 and 92 respectively, formed in the hub. The studs 86 carry a member 94 having two oppositely projecting arms 94a and 94b. Arm 94a has secured thereto the adjustably mounted pin 96 bearing against piston 72 and arm 94b carries a similar pin 98 bearing against the piston 74. It will be understood that the cylinder chambers 80 and 82 are filled with a suitable liquid, such as oil, the pins 96 and 98 being adjusted so that the cylinder system and connection 84 are solidly filled with liquid so that any movement of the pistons in their respective cylinders must result in flow of liquid from one to the other of the cylinders through the connection 84.

In operation the propeller is driven by torque derived from shaft 14 and transmitted to the blades through the hub, the blades being free to pivot around their axes of rotation, that is the axes 46 and 46a, in order to assume the proper pitch angle for any given set of conditions. This pivotal movement is subject to certain restraining influences imposed thereon by the damping mechanism if such a mechanism is employed, but as will hereinafter be more fully explained, the action of the damping mechanism is such that the blades may be said to be free to pivot about their axes for the purpose of performing their normal functions.

The manner in which the forces acting on the blades are applied so that the blades will assume a pitch angle insuring a constant speed of operation for any given amount of power developed, may best be understood by considering the forces acting on the section or elements of the blade at the point where the resultant of the aerodynamic forces applied to the blade is located. In the majority of instances, with blades of present airfoil designs, this section which will hereinafter be referred to as the representative section of blade, or unless otherwise qualified as the blade section, usually lies somewhere in the neighborhood of .7 of the distance from the axis of rotation of the propeller to the tip of the blade.

Referring now more particularly to Figs. 6 through 11, the diagram of Fig. 6 shows diagrammatically in side elevation, a propeller of the kind previously described, and Fig. 7 shows it from the rear. The representative section of the blade 30 is indicated at 100.

In these figures it will be evident that if the blade 30 is rotated in the hub completely about its axis of rotation 46a, that is the axis normal to the plane of the bearing or bearings by which the blade is mounted in the hub, the section 100 will travel in a circle 102 lying in a plane oblique with respect to the axis of rotation 36 of the propeller.

It further becomes evident from Fig. 7 that the true projection of circle 102 into a plane of rotation, that is, a plane normal to axis 36, provides a means of determining the position which section 100 will tend to seek when acted upon by centrifugal force. If the mass of section 100 were concentrated at a point on circle 102, it would tend to move the greatest possible distance from axis 36.

If blade axis 112 intersected the pivotal axis 46a at the rotational axis 36 (see Fig. 6), then a portion of the projection of circle 102 will be tangent to an arc 104 at radius 106 from axis 36. In this event, the mass of section 100 would remain at a nearly constant radius from the axis of rotation 36 for a limited movement from position 100t, so there would be little or no centrifugal force restraining such movement.

There are two reasons why it is not desirable to have the blade axis 112 intersect the pivotal axis 46a at the rotational axis 36. First, such a design would be difficult to accomplish from the structural standpoint. Second, it is not desirable to eliminate the centrifugal force tending to restore the section 100 to position 100t because it is necessary to introduce a stabilizing moment which will counteract the unstable thrust moment.

If blade axis 112 intersects pivotal axis 46a at 47, as shown in Figure 6, then the projection of circle 102 will be tangent to arc 104 only at position 100t. Movement of section 100 to either side of position 100t will result in bringing section 100 closer to the axis of rotation 36 because radius 105 is less than radius 106. Radius 105 will describe an arc substantially coincident to the projection of circle 102 for a limited distance on either side of position 100t, or between 110a and 100b. Inasmuch as centrifugal force tends to throw section 100 the farthest distance away from 36 possible or into position 100t, any movement of section 100 away from position 100t will result in creating a moment tending to restore section 100 to position 100t. The magnitude of this moment will increase as the displacement of section 100 away from position 100t increases. Inasmuch as this restoring moment results from the displaceemnt of intersection 47 from axis 36, the magnitude of the restoring moment is likewise a function of the radius of intersection 47; increasing of which will result in increasing the centrifugal restoring moment. It is possible, therefore, to adjust the magnitude of this centrifugal restoring moment to suit the particular design conditions, because the value of the unstable thrust moment, for which neutralization must be achieved, depends on each application.

Another centrifugal restoring moment is derived from the forward tilting component of axis 112 as it rotates around axis 46a. As section 100 travels in a plane 8—8, it is farthest away from axis 36 when it is in position 100t. For small angular displacements, the forward tilt of axis 112 will not be great, but it nevertheless is present and increases rapidly as the angular displacement increases.

In order to provide a centrifugal movement tending to increase the pitch of the propeller blade, the eccentric clamping ring 60 is provided, this being shown more clearly in Fig. 8. This weight is subject to the same characteristic of centrifugal force as is the blade section and under the influence of that force tends always to turn in counterclockwise direction as viewed in Fig. 8 from the position shown in that figure to a position where the center of gravity 60a of the weight is as far as possible from the axis of rotation 36.

Fig. 9 shows a projection of the circular path of travel 108 of the center of gravity 60a of weight 60, on a plane of rotation. It can be seen that this weight 60 will tend to move through the action of centrifugal force in such a direction that the center of gravity will increase its distance from the center of rotation. As the radius 110 represents the greatest distance the center of gravity 60a can move from the axis of rotation 36, the tendency will be for the center of gravity to move to the right or counterclockwise as viewed in Fig. 9. By reference to Fig. 8, it will be seen that such movement will tend to increase the pitch angle of the blade.

In addition to the centrifugal force acting on the blade there must be taken into consideration the aerodynamic and torque forces acting on it. In the diagram of Fig. 10 the base line B indicates rotational velocity of the blade section and the line V represents forward or air speed velocity. The resultant H represents the helix path of the blade and the angle between line H and line A represents the angle of attack. The lift or pull of the blade, which always acts at right angles to the helix path, is designated in Fig. 10 by the vector L. The drag, represented by vector D, always acts at right angles to the direction of the lift, thus giving a resultant force represented in the diagram by vector R. This resultant may be resolved into a torgue component Q lying in the plane of rotation of the section and a thrust component T parallel to the axis of rotation.

Applying these force components to the section shown in Fig. 8 it will be apparent that if the section is located at position 100t, the thrust component is coincident with the pivot axis 46a of the blade and consequently exerts no twisting moment on the blade tending to make it pivot.

As the blade is displaced from position 100t, the thrust moment will increase in proportion to the displacement. This moment tends to increase the displacement, consequently has an unstable effect. There exists, however, a stable moment due to centrifugal force acting on the blade which can be utilized to neutralize the unstable thrust moment. It so happens that with displacement of section 100, the stable centrifugal moment builds up as fast, if not faster, than the unstable thrust moment, so there is no tendency for the thrust moment to take charge. On the other hand, the torque component Q tends to make the blade twist about its pivot axis in a direction such that the section 100 will move in clockwise direction as seen in Fig. 8, from position 100t towards position 100a. Movement in this direction will tend to decrease pitch, but this movement is resisted by the twisting moment created by centrifugal force acting on the eccentric clamping ring 60 and tending to move the blade from a position such as 100a towards position 100b. In many instances, it will be desirable to have the thrust component exert a minor or negligible influence on the action of the blade, balance being achieved essentially by opposing centrifugal and torque forces. To this end it is desirable to have the blade operate within a range of twisting movement closely adjacent to the position 100t in Fig. 7.

In order to change the position of the normal operating range of the blade, all that it is necessary to do is to change the pitch of the blade relative to the socket. It is for this reason that the construction illustrated in Fig. 1, in which the blade shank is made separate from the socket member and turnable with respect thereto, is advantageous, since the clamping bolt 44 can be loosened and the threaded shank turned in the socket to provide any desired angular relationship.

Obviously if the blade adjustment feature is not required or desired, as in the case of mass production of a standardized propeller for a given engine and plane, the pivoted blade assembly may be made as one piece, with the shank of the blade being bent to in effect form a socket member integral with the remainder of the blade and with the blade shank mounted by a suitable bearing to pivot directly in the hub.

It is to be noted, however, that it is generally preferable to have the normal operating range somewhere in the vicinity of the range shown in Figs. 7 and 8. This is readily demonstrated from a consideration of the diagram shown in Fig. 11 wherein position 100c may be assumed to be midposition of a different operating range. In this position the resultant force R acting on the section is at radius $d$ from the pivot axis of the blade and the thrust component T is at a substantial distance from the pivot axis R coincident therewith as in Fig. 8. Consequently, with the arrangement shown in Fig. 11 there is a substantial moment acting on the blade due to thrust, which it is preferable to eliminate as far as possible, since this force is variable under different air speed conditions. This minimizing or elimination of the thrust component as a factor effecting pitch is effected by having the operating range as previously described in connection with Figs. 6 to 8.

It is also to be noted that the construction illustrated, which permits the ring 60 to be rotationally shifted, is of advantage since the ability to shift the position of this weight affords the opportunity of making relatively fine adjustment for any given propeller blade, in order to compensate for minor variations of contour or uniformity of density of material in different blades, the latter being a consideration to be reckoned with in the case of wooden blades.

It is further to be noted that within the scope of the invention many different values of angular and weight relationships between the several elements may be employed to suit the specific requirements for a given propeller. For example, in Fig. 6 the angle between the pivot axis 46a and the neutral axis 112 of the blade is the same as the angle between the pivot axis and the plane of rotation, thus bringing the neutral axis of the blade into a plane of rotation when the blade section is in position 100. This need not necessarily be the case, since the angle of tilt of axis 46a may have a greater or less value which, with a given value of $\beta$ would result in modifying the projection of circle 102 on the plane of rotation. Tilting the axis of rotation forward from the position shown in Fig. 6 will reduce the extent to which circle 102 would be approximately tangent to the circle described by radius 106. On the other hand, tilting the axis of blade rotation to the rear would flatten the projection of circle 102 so that it would be tangent to the circle described by radius 106 at two points near the ends of the projection of circle 102. Thus, it will be observed that changing the structure to alter the value of angle $\beta$ provides a means for varying the extent and direction of action of the centrifugal force on the section 100.

It is to be noted in this connection that there are two variables available in connection with any specific design. The first is the inclination of the axis 46a with respect to the axis of rotation 36, which affects the nature of the projection of the circle of movement of the blade section on the plane of rotation and the second is the angle between the pivot axis 46a of the blade and the neutral axis 112 of the blade, which determines the amplitude of the circle of gyration of the blade section about the pivot axis. These variables, coupled with the variables provided by mass and location of the center of gravity of the weight 60, provide means whereby any designer may readily adjust and relate the various forces involved so as to take care of the requirements for a given propeller intended to absorb a given amount of power at a given speed of rotation.

Since the blades are freely pivoted it is desirable to provide suitable stops acting between the blades and the hub for mechanically limiting the range of pivotal movement of the blades. These stops may be of any convenient nature and may advantageously, for example, be provided by the ends of the segmental gears such as gear 56, abutting against a suitable stop shoulder on the interior of the hub socket, or, when damping mechanism such as that hereinbefore described is employed, suitable stop means may be provided by the abutment of the studs 86 and 88 against the ends of slots 90 and 92, respectively.

It is to be noted that while in the present embodiment the blades are shown as interconnected by gearing, it is to be understood that the employment of such gearing is not essential to the operability of a propeller constructed in accordance with the present invention. With a propeller constructed in accordance with this invention, each blade will assume a proper pitch position under the influence of torque, centrifugal and aerodynamic forces alone. It is, however, desirable from a practical operating standpoint to have pitch adjustment of the several blades synchronized and the gearing herein disclosed comprising the segmental gears fixed to the blades and the connecting gear member 50 turnable relative to the hub, functions merely as a synchronizer which is not required to transmit driving torque. Consequently, these gears may be made very much smaller and lighter than the gear or other mechanism used to transmit driving torque to the blades in prior forms of adjustable blade propellers in which the pitch of the blades is responsive to driving torque transmitted to the blades through gears or equivalent mechanism.

To be of maximum utility a propeller must be capable of functioning when driven by many different types of prime movers. In many instances it is desirable to drive propellers with internal combustion engines having relatively few cylinders. In such engines there is a wide fluctuation in the momentary value of the torque delivered by the engine crank shaft and I have discovered that in a propeller of the kind in which the pitch angle of the blades is determined by opposed torque and centrifugal forces, oscillation of the blades about their pivot axes may be set up when the relatively constant centrifugal forces are opposed by the highly variable torque derived from an engine having comparatively few cylinders. Such oscillation, particularly at certain speeds, may become of critical nature, resulting in increasing the amplitude of oscillation to a point where hammering may be set up against the stops limiting the pivotal movement of the blades. In order to obviate any action of this character, regardless of driving torque characteristics to which the propeller may be subjected, I provide the damping means comprising the damping cylinders and pistons previously described. It is believed that the operation of this damping means will be largely evident from Figs. 4 and 5, from which it will be evident that any pivoting movement of the blades relative to the hub will result in a turning movement of the gear member 50 and the member 94 carried by the studs 86, relative to the cylinder member 64 which is fixed to the hub. This relative movement will cause one or the other of the pistons 72 and 74 to move inwardly of its cylinder while the other moves outwardly, thus forcing liquid to flow through the connection 84. This flow acts to damp high frequency oscillations of a vibratory character while at the same time the flow through the connection 84 permits relative movement of the parts at a sufficiently rapid rate to enable desired pitch adjustment of the blades to be rapidly effected by the pitch controlling forces. While the flow through the connection 84 may obviously be made subject to adjusted control through some form of orifice having means for changing the flow area, I have found from experience that this refinement is not ordinarily required in order to effectively damp oscillations while at the same time permitting sufficient flow to allow required rapidity of normal adjusting movement of the blades. Consequently, in the interests of simplicity it is ordinarily preferable to omit any such flow adjustment means.

It is inherently characteristic of a propeller embodying the principles of the present invention that the opposed torque and centrifugal moments enable a condition of stable balance to be obtained which will result in a blade assuming a pitch position that will operate to provide a substantially constant rotational speed of the propeller for a given power input to the propeller. If with a given power input the propeller speed momentarily increases due to any cause, the centrifugal moment is increased. This results in a pitch increasing adjustment with consequent increase in resistance to engine torque causing reduction in speed. Conversely, if the speed momentarily decreases, the centrifugal moment is reduced allowing the pitch decreasing moment derived from driving torque to effect a pitch decreasing adjustment of the blade. This decreases the power absorbing capacity of the propeller which results in increasing the rotational speed of the propeller. If the engine is throttled, the torque supplied to the propeller is reduced and this results in a lower equilibrium speed of rotation. The change in speed will be proportional to the square root of the change in torque which is an advantageous relationship for cruising conditions for an aircraft operating at reduced power.

Since as explained above, a propeller embodying the principles of the present invention will rotate at substantially constant speed for any given power input, it follows that if driven at any given speed such a propeller will always absorb substantially the same amount of power, regardless of change in aerodynamic conditions. By utilizing this inherent characteristic I am enabled also to provide in accordance with the invention a dual or oppositely rotating propeller unit of simple and relatively light construction in which the necessity for providing torque compensating or balancing mechanism is not required. To illustrate this phase of the invention, I have shown in Fig. 12 in diagrammatic form a dual propeller unit in accordance with the invention. Referring now to this figure, the drive shaft which in this instance has been indicated as an engine crank shaft, is attached to the hub 10 of a forward propeller indicated generally at 114, the construction of which is indicated as being the same as that shown in Figs. 1 and 2. The direction of rotation of the shaft 14 is assumed to be counterclockwise as viewed from the left of Fig. 12, as indicated by the arrow 115.

Shaft 14 has fixed thereto a bevel gear 116 meshing with a series of pinions 118 which are carried by any suitably rotationally stationary mounting structure. These pinions mesh with a second bevel gear 120 fixed to a quill shaft 122 located around a portion of shaft 14 and fixed to the hub 10 of a second or aft propeller 124. By reason of the gearing comprising gears 116, 118 and 120 propeller 124 is caused to rotate in a clockwise direction as viewed from the left of Fig. 12, as shown by the arrow 126. Propellers 114 and 124 may be of like construction except for the disposition of the blades to take care of the opposite directions of rotation of the propellers. It will be evident, of course, that with the gearing shown, the two propellers will always rotate at like absolute speeds of rotation but in different directions.

Since the aft propeller 124 is located in the slipstream of the forward propeller 114, the aerodynamic conditions affecting the two propellers will not be the same at any given instant. This, however, is not material with the construction shown since with each propeller there is a definite fixed relationship between power and speed of rotation regardless of differences in aerodynamic conditions. Consequently, even though the aerodynamic conditions affecting the two propellers are different, the fact that they must necessarily rotate at the same speed results in each propeller absorbing the same amount of power as the other. This ability to absorb the same amount of power while rotating at the same speed under different aerodynamic conditions is effected by the action of the blades which will automatically assume pitch positions in the two propellers, the difference between which will compensate for the difference in aerodynamic conditions affecting two propellers. This being the case equalization of the values of driving torque applied to the two propellers from the common drive shaft 14 is automatically effected without the necessity for any torque equalizing or balancing mechanism, the only mechanism for interconnecting the two propellers of the unit being gearing or the like for insuring that they both rotate at the same speed.

While from the standpoint of the nature and magnitude of the stresses imposed upon the bearings in which the blades are pivoted, it is advantageous to arrange the construction so that the pivot axes of the blades intersect the axis of rotation of the hub, and such construction has been shown herein by way of illustration, this is not essential since a suitable driving torque moment can be imposed on the blades by torque applied thereto through the hub, when the hub and blade arrangement is such that the pivot axes of the blades are laterally offset with respect to the axis of hub rotation. Also, the relation of the values of the angle of inclination of the pivot axes of the blades with respect to the axis of rotation and the value of the angle between the pivot axes and the neutral axes of the blades may be such that the angle $\epsilon$ of Fig. 6 may be less than 90° so that the circle of movement of the blade section intersects a plane of rotation, the blade section in such case being behind the plane of rotation if located in the portion of the circle of travel which is most remote radially from the axis of hub rotation. Regardless of the variation in specific relationships, the blade sections should in all cases have operating ranges so located that the centrifugal twisting moment tends to pivot the blades in a direction resulting in increase of pitch.

From the foregoing it will be apparent that many changes and modifications may be made in the arrangement and relationships of the component parts of the propeller structure and various specific mechanical designs may be employed within the scope of the invention, which is to be understood as embracing all forms of construction falling within the scope of the appended claims.

What is claimed is:

1. An oppositely rotating propeller unit comprising two propellers, each of said propellers comprising a hub adapted to be rotated by a driving member and a pivoted blade member carried and driven by the hub, said blade member pivoting about an axis inclined with respect to a plane normal to the axis of rotation and having a blade the neutral axis of which is inclined with respect to the pivot axis of the blade which intersects said pivot axis at a place radially spaced from the axis of rotation of the hub, whereby to determine the pivotal position of the blade and the pitch angle thereof by opposed centrifugal forces acting on said blade member and driving torque forces, a common driving member, and means for interconnecting the hub of each of said propellers with each other and with said common driving member to cause said hubs to be rotated in opposite directions at the same absolute speeds.

2. An oppositely rotating propeller unit comprising two propellers, each of said propellers comprising a hub adapted to be rotated by a driving member and a pivoted blade member carried and driven by the hub, said blade member pivoting about an axis forwardly inclined with respect to a plane normal to the axis of rotation and having a blade the neutral axis of which is rearwardly inclined with respect to the pivot axis of the blade to a position such that said neutral and pivot axes intersect at a place radially spaced from said axis of rotation and that in at least one position in the working range of the blade said neutral axis lies in or adjacent to a plane common to said pivot axis and said axis of rotation, whereby to determine the pivotal position of the blade and the pitch angle thereof by opposed centrifugal forces acting on said blade member and driving torque forces, a common driving member, and means for interconnecting the hub of each of said propellers with each other and with said common driving member to cause said hubs to be rotated in opposite directions at the same absolute speeds.

3. An airscrew comprising a hub adapted to be rotated by a drive shaft, a blade pivotally carried by said hub to turn about a pivot axis inclined with respect to the plane of rotation of the airscrew, said pivot axis intersecting the neutral axis of the blade at a place radially spaced from the axis of rotation of the airscrew, and a weight carried by said blade and having its center of gravity located in a quadrant traversed by a line normal to the chord of the representative section of the blade for exerting a twisting moment due to centrifugal force acting to increase the blade pitch.

4. An airscrew comprising a hub adapted to be rotated by a drive shaft, a blade pivotally carried by said hub to turn about a pivot axis inclined with respect to the plane of rotation of the airscrew, said pivot axis intersecting the neutral axis of the blade at a place radially spaced from the axis of rotation of the airscrew and adjacent to the inner end of the blade, and a weight carried by said blade and having its center of gravity located in a quadrant traversed by a line normal to the chord of the representative section of the blade for exerting a twisting moment due to centrifugal force acting to increase the blade pitch.

5. An airscrew comprising a hub adapted to be rotated by a drive shaft, a blade pivotally carried by said hub to turn about a pivot axis inclined with respect to the plane of rotation of the airscrew, said pivot axis intersecting the neutral axis of the blade at a place radially spaced from the axis of rotation of the airscrew, and a weight carried by said blade and having its center of gravity located in a position substantially at right angles with respect to the chord of the representative section of the blade for exerting a twisting moment due to centrifugal force acting to increase the blade pitch.

6. An airscrew comprising a hub adapted to be rotated by a drive shaft, a blade pivotally carried by said hub to turn about a pivot axis inclined with respect to the plane of rotation of the airscrew, said pivot axis intersecting the neutral axis of the blade at a place radially spaced from the axis of rotation of the airscrew and adjacent to the inner end of the blade, and a weight carried by said blade and having its center of gravity located in a position substantially at right angles with respect to the chord of the representative section of the blade for exerting a twisting moment due to centrifugal force acting to increase the blade pitch.

DAVID BIERMANN.

REFERENCES CITED

The following references are of record in the file of this patent:

UNITED STATES PATENTS

| Number | Name | Date |
| --- | --- | --- |
| 1,800,094 | Muhlenbruck | Apr. 7, 1931 |
| 1,872,337 | Pillard | Aug. 16, 1932 |
| 1,875,998 | Everts | Sept. 6, 1932 |
| 1,940,200 | Wingler | Dec. 19, 1933 |
| 1,943,210 | De Lavaud | Jan. 9, 1934 |
| 2,013,930 | Squires | Sept. 10, 1935 |
| 2,234,196 | Prewitt | Mar. 11, 1941 |
| 1,982,170 | Lansing | Nov. 27, 1934 |

(Other references on following page)

| Number | Name | Date |
|---|---|---|
| 1,520,746 | Boyce | Dec. 30, 1924 |
| 2,297,815 | Tidd | Oct. 6, 1942 |
| 2,219,303 | Fraser | Oct. 29, 1940 |
| 2,045,355 | Hays | June 23, 1936 |
| 2,117,062 | Jablonsky | May 10, 1938 |
| 2,324,569 | Everts | July 20, 1943 |
| 1,786,644 | Davis | Dec. 30, 1930 |
| 1,879,935 | Hill | Sept. 27, 1932 |
| 2,359,265 | Hackethal | Sept. 26, 1944 |
| 2,336,012 | Hackethal | Dec. 7, 1943 |
| 2,177,315 | De Caria | Oct. 24, 1939 |

FOREIGN PATENTS

| Number | Country | Date |
|---|---|---|
| 302,097 | Great Britain | Dec. 13, 1928 |
| 447,424 | Great Britain | May 19, 1936 |
| 115,376 | Australia | June 19, 1942 |
| 496,750 | Great Britain | Dec. 5, 1938 |
| 324,755 | Italy | Feb. 14, 1935 |
| 450,854 | Great Britain | July 24, 1936 |
| 457,584 | Great Britain | Dec. 1, 1936 |